US006913211B2

United States Patent
Chen

(10) Patent No.: US 6,913,211 B2
(45) Date of Patent: Jul. 5, 2005

(54) CONNECTION STRUCTURE OF A NOZZLE AND EXTENSION PIPE OF A SPRINKLER

(76) Inventor: Chin-Yuan Chen, No. 75, Liau Tsuoh Lane, Liau Tsuoh Li, Lu-Kang Chen, Chang-Hua Hsien (TW)

( * ) Notice: Subject to any disclaimer, the term of this patent is extended or adjusted under 35 U.S.C. 154(b) by 0 days.

(21) Appl. No.: 10/719,251

(22) Filed: Nov. 24, 2003

(65) Prior Publication Data

US 2005/0109863 A1   May 26, 2005

(51) Int. Cl.[7] .......................... B05B 15/06; B05B 9/08; A62C 31/24
(52) U.S. Cl. .................. 239/532; 239/280; 239/280.5; 239/281; 239/530
(58) Field of Search ............................. 239/280, 280.5, 239/281, 530, 532, 587.1; 285/114, 302, 285/339, 342

(56) References Cited

U.S. PATENT DOCUMENTS

| 4,489,914 | A | * | 12/1984 | Stevenson et al. | ....... 239/587.1 |
|---|---|---|---|---|---|
| 5,462,311 | A | * | 10/1995 | Cipolla | ........................ 285/302 |
| 5,622,446 | A | * | 4/1997 | Hibberd | ...................... 403/377 |
| 6,045,284 | A | * | 4/2000 | Chiu | .......................... 285/302 |
| 6,216,965 | B1 | * | 4/2001 | Chao | .......................... 239/280 |
| 6,322,006 | B1 | * | 11/2001 | Guo | ........................... 239/532 |
| 6,447,021 | B1 | * | 9/2002 | Haynes | ....................... 285/302 |
| 6,581,853 | B1 | * | 6/2003 | Huang | ......................... 239/532 |
| 6,619,570 | B1 | * | 9/2003 | Ericksen et al. | ............ 239/532 |
| 6,634,822 | B1 | * | 10/2003 | Wang | ...................... 239/587.1 |

* cited by examiner

Primary Examiner—Davis Hwu
(74) Attorney, Agent, or Firm—Alan D. Kamrath; Nikolai & Mersereau, P.A.

(57) ABSTRACT

A sprinkler includes a handle, a nozzle, and a connection structure for connecting the nozzle to the handle. The connection structure has an extension pipe and a connection member. The extension pipe is formed of an outer tube fastened at a bottom end to the handle, and an inner tube fastened at a top end to the nozzle. The connection member is formed of a first connector and a second connector. The first connector is engaged with a top end of the outer tube and is engaged with the second connector. The inner tube is slidably fitted at a bottom end into the top end of the outer tube through the first connector such that the inner tube is intimately embraced by the first connector.

8 Claims, 6 Drawing Sheets

CONNECTION STRUCTURE OF A NOZZLE AND EXTENSION PIPE OF A SPRINKLER

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates generally to a sprinkler, and more particularly to a structure of connecting a nozzle with an extension pipe of the sprinkler.

BACKGROUND OF THE INVENTION

The conventional sprinkler comprises a handle, a nozzle, and an extension pipe located between the handle and the nozzle. The extension pipe is provided with an adjustment device for adjusting the length of the extension pipe. The extension pipe is formed of an outer tube and an inner tube slidably fitted into the outer tube. The adjustment device comprises female threads, male threads, and a plurality of elastic retaining pieces which are arranged circularly at intervals. The elastic retaining pieces are intended to locate the inner tube. However, the elastic retaining pieces are ineffective in locating the inner tube.

BRIEF SUMMARY OF THE INVENTION

The primary objective of the present invention is to provide a sprinkler with a connection structure for connecting a nozzle and an extension pipe of the sprinkler.

The connection structure of the present invention comprises an inner tube, an outer tube, and an adjustment member located between the inner tube and the outer tube. The inner tube is fastened at a top end with a nozzle, whereas the outer tube is fastened at a bottom end with a handle. The inner tube is slidably fitted at a bottom end into a top end of the outer tube through the adjustment member. The inner tube and the outer tube constitute the extension pipe of the present invention.

The adjustment member is formed of a first connector and a second connector. The first connector is engaged with the top end of the outer tube and is fitted into the second connector. The bottom end of the inner tube is slidably fitted into the top end of the outer tube through the first connector which is provided with means to hold securely the inner tube.

The features and the advantages of the present invention will be more readily understood upon a thoughtful deliberation of the following detailed description of the preferred embodiments of the present invention with reference to the accompanying drawings.

DETAILED DESCRIPTION OF THE INVENTION

Figure 1:
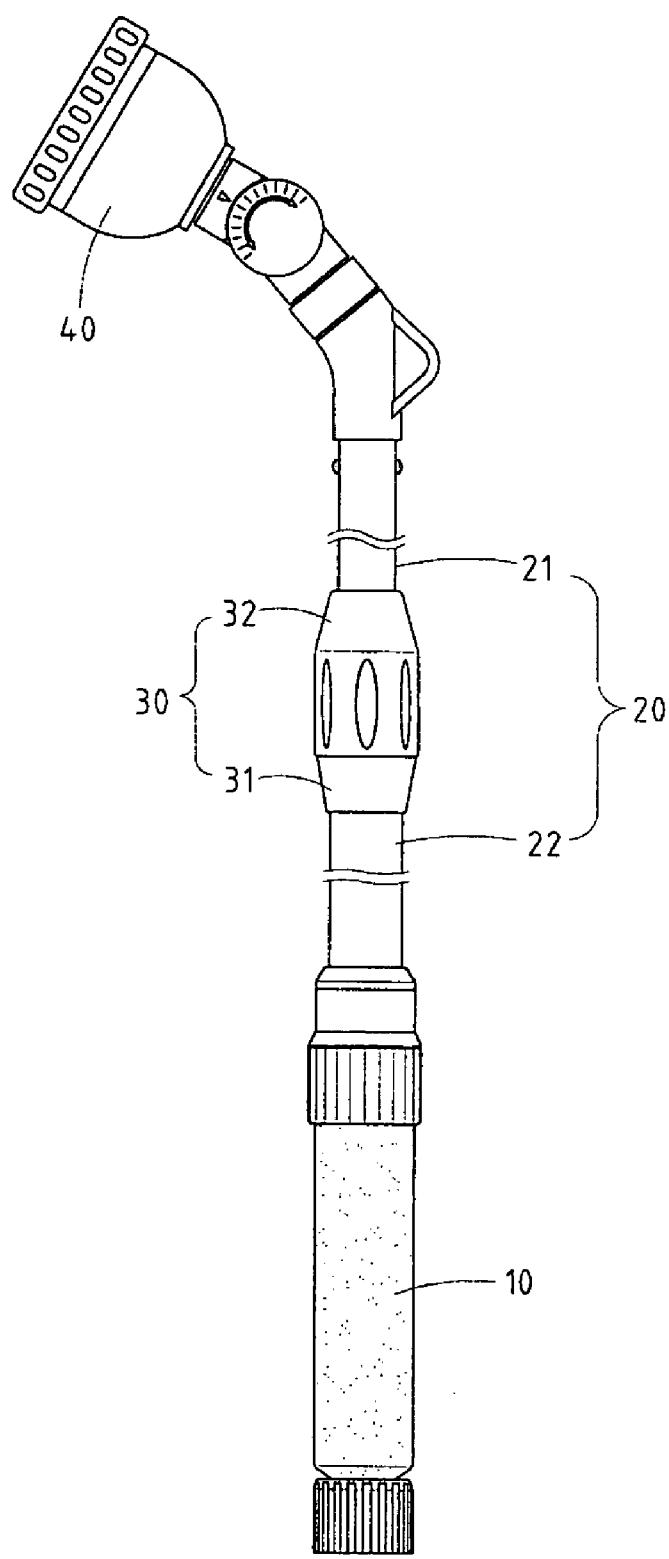
FIG. 1 shows a side schematic view of a first preferred embodiment of the present invention.
Figure 2:
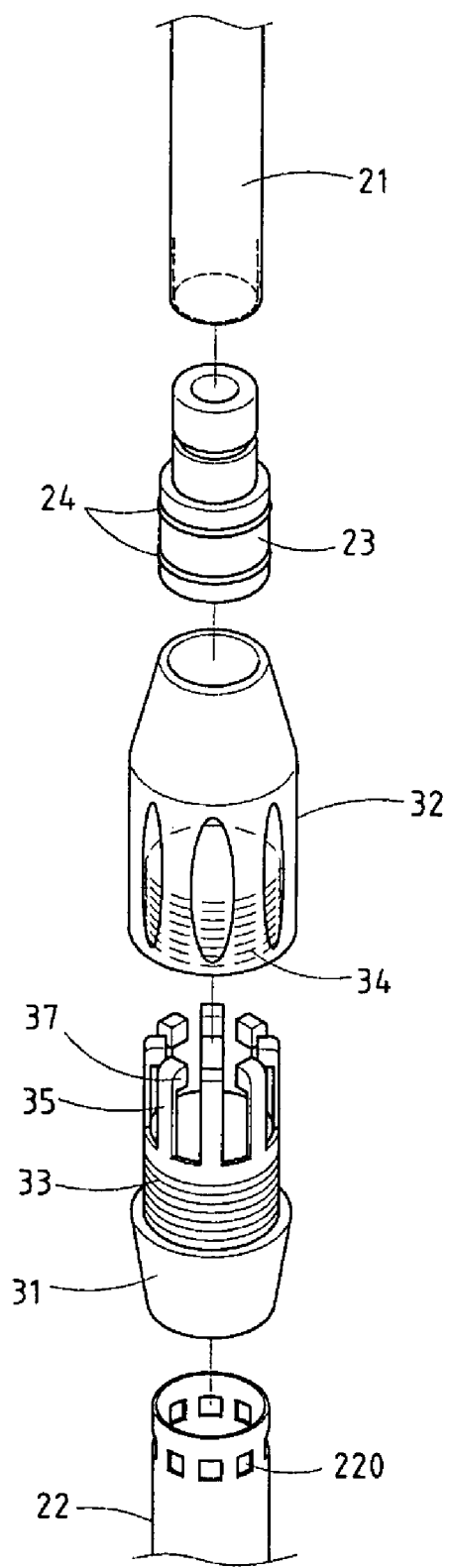
FIG. 2 shows an exploded perspective view of the first preferred embodiment of the present invention.
Figure 3:
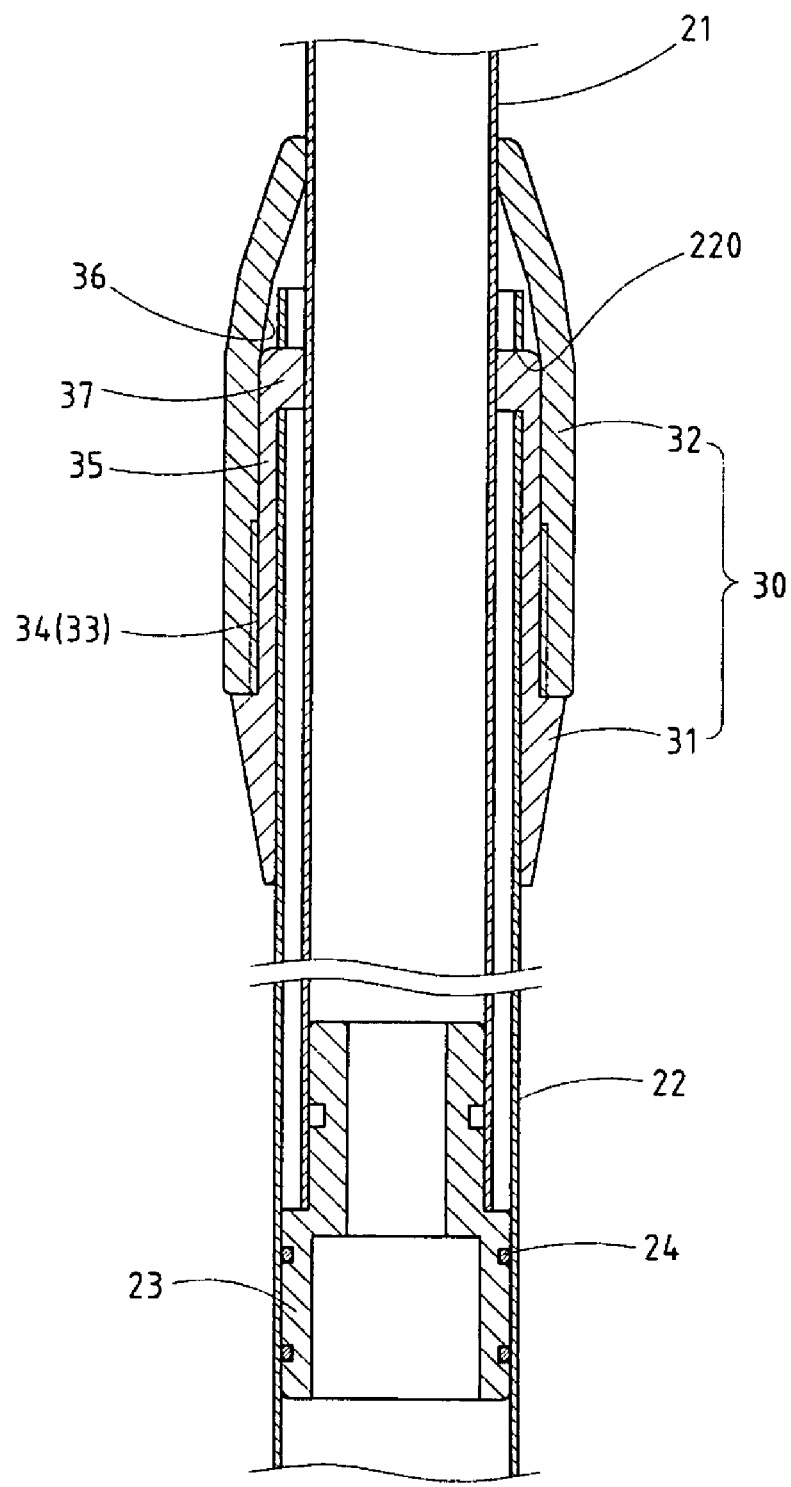
FIG. 3 shows a longitudinal sectional view of the first preferred embodiment of the present invention.

As shown in FIGS. 1, 2, and 3, a sprinkler embodied in the present invention comprises a handle 10, an extension pipe 20, an adjustment member 30, and a nozzle 40. The nozzle 40 is fastened with a top end of the extension pipe 20. The handle 10 is fastened with a bottom end of the extension pipe 20. The adjustment member 30 is located at a midsection of the extension pipe 20. It must be noted here that the extension pipe 20 may be either expandable or nonexpansive. The extension pipe 20 of the first preferred embodiment of the present invention is expandable and is formed of an inner tube 21 and an outer tube 22.

The inner tube 21 is provided at a bottom end with a slide block 23 having a plurality of washers 24. The inner tube 21 is fastened at a top end with the nozzle 40.

The outer tube 22 is fastened at a bottom end with the handle 10 and is provided at a top end with a plurality of through holes 220, which are arranged at intervals.

The adjustment member 30 is formed of a hollow first connector 31 and a hollow second connector 32. The first connector 31 has a bottom end, which is fitted over the top end of the outer tube 22, as shown in FIG. 3. The first connector 31 has a midsegment, which is provided with outer threads 33. The first connector 31 has a top end, which is provided with a plurality of elastic retaining pieces 35. The elastic retaining pieces 35 are arranged at intervals and are provided at a top end with a retaining projection 37 corresponding to the through holes 220 of the outer tube 22. The second connector 32 is of a hollow construction and is provided in a bottom end segment with inner threads 34 engageable with the outer threads 33 of the first connector 31. The second connector 32 has a top end segment which is of a tapered construction.

As shown in FIG. 3, the slide block 23 of the bottom end of the inner tube 21 is slidably fitted into the outer tube 22 through the hollow first connector 31 which is fitted into the second connector 32 in such a manner that the outer threads 33 of the first connector 31 are engaged with the inner threads 33 of the first connector 31 are engaged with the inner threads 34 of the second connector 32. In the meantime, the inner tube 21 is intimately embraced by the elastic retaining pieces 35 of the first connector 31 at the time when the second connector 32 is fastened against the first connector 31.

The engagement of the first connector 31 with the outer tube 22 is enhanced by the retaining projections 37, which are extended from the elastic retaining pieces 35 and are retained in the through holes 220 of the outer tube 22. In fact, the retaining projections 37 embrace intimately the inner tube 21 via the through holes 220 of the outer tube 22, as shown in FIG. 3.

Figure 4:
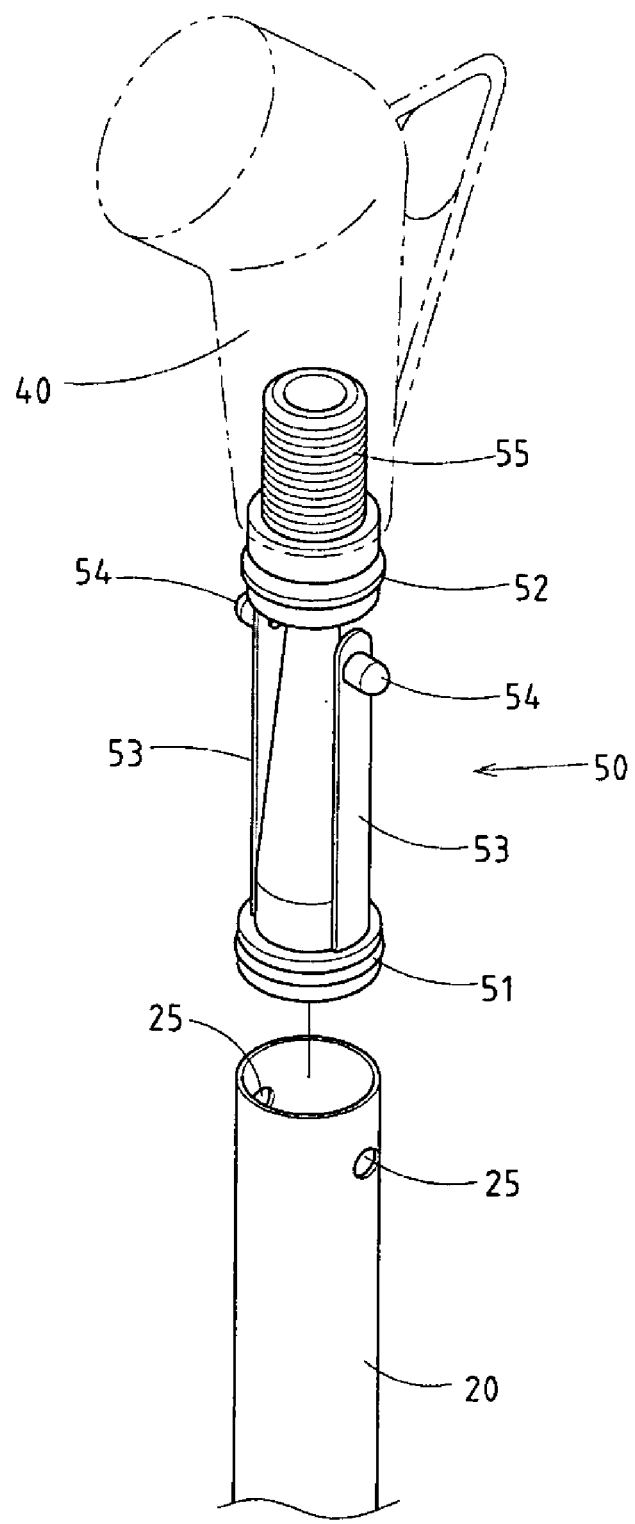
FIG. 4 shows an exploded perspective view of a second preferred embodiment of the present invention.
Figure 5:
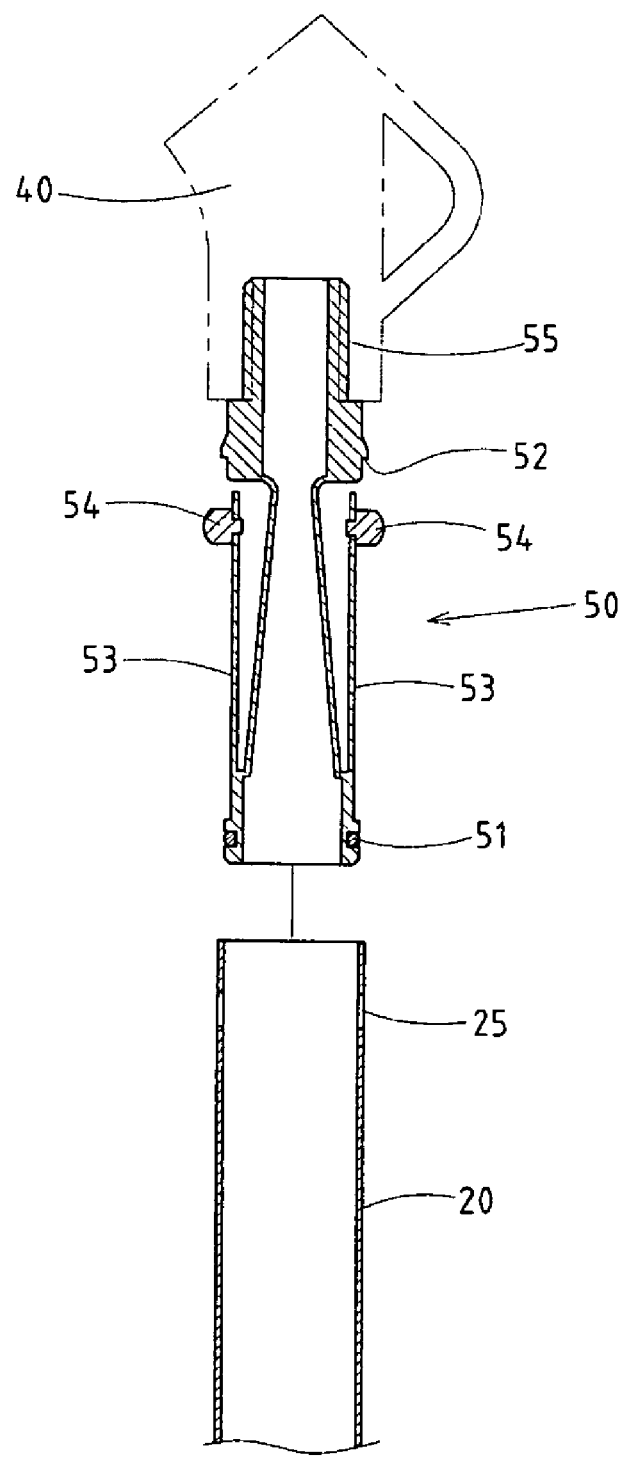
FIG. 5 shows another exploded perspective view of the second preferred embodiment of the present invention.
Figure 6:
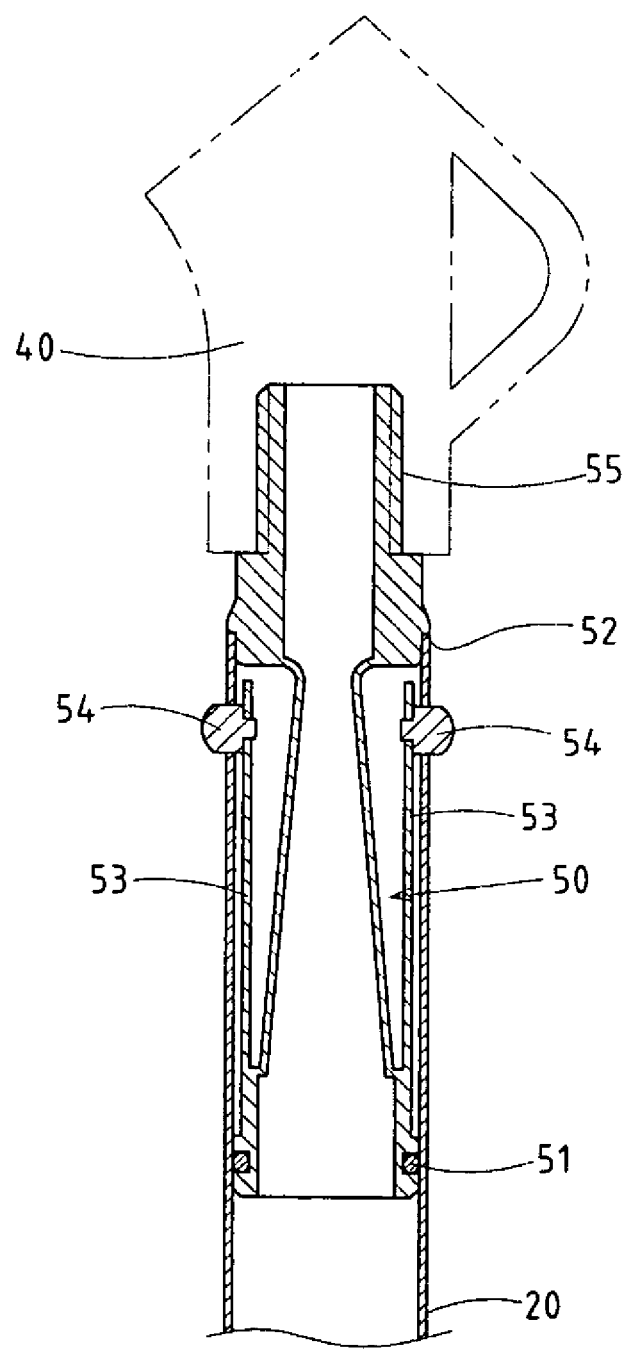
FIG. 6 shows a longitudinal sectional view of the second preferred embodiment of the present invention in combination.

As shown in FIGS. 4, 5, and 6, a sprinkler of the second preferred embodiment of the present invention comprises an extension pipe 20, a nozzle 40, and a connection device 50 by which the extension pipe 20 is connected with the nozzle 40. The extension pipe 20 is nonexpansive. The extension pipe 20 is provided at a top end with a plurality of locating holes 25 and is fastened at a bottom end with a handle (not shown in the drawings). The connection device 50 is provided at a bottom end with one or more washers 51, and at a top end with a stop edge 52, and a threaded rod 55 extending from the stop edge 52. The connection device 50 is further provided with a plurality of elastic locating pieces 53 extending from the bottom end of the connection device 50 toward the top end of the connection device 50. The elastic locating pieces 53 are corresponding in number to the locating holes 25 of the extension pipe 20 and are provided at a free end with a locating projection 54 engageable with the locating holes 25 of the extension pipe 20.

The nozzle 40 is fastened with the threaded rod 55 of the connection device 50. The extension pipe 20 is fastened with the connection device 50 in such a way that the bottom end and the washers 51 of the connection device 50 are fitted into the extension pipe 20, and that the locating projections 54 of the elastic locating pieces 53 of the connection device 50 are retained in the locating holes 25 of the extension pipe 20, as shown in FIG. 6.

The embodiments of the present invention described above are to be regarded in all respects as being illustrative and nonrestrictive. Accordingly, the present invention may be embodied in other specific forms without deviating from the spirit thereof. The present invention is therefore to be limited only by the scope of the following claims.

I claim:

1. A sprinkler comprising:
a handle;
a nozzle; and
a connection structure for connecting said nozzle to said handle in such a manner that said connection structure is fastened at a top end with said nozzle, and at a bottom end with said handle;
wherein said connection structure comprises:
a connection member formed of a first connector of a hollow construction, and a second connector of a hollow construction, said first connector being provided at an upper end portion with outer threads and a plurality of elastic retaining pieces arranged at intervals, said second connector being provided in a lower end portion with inner threads and being rotatably engaged with said first connector in such a way that said second connector is fitted over said first connector, and that said inner threads of said second connector are engaged with said outer threads of said first connector; and
an extension pipe formed of an outer tube and an inner tube, said outer tube being fastened at a top end with a lower end portion of said first connector, and at a bottom end with said handle, said inner tube being fastened at a top end with said nozzle such that a bottom end of said inner tube is slidably fitted into the top end of said outer tube through said first connector and said second connector, with said inner tube being intimately embraced by said elastic retaining pieces of said first connector when said second connector is fastened against said first connector; wherein
said elastic retaining pieces of said first connector of said connection member are provided with a retaining projection;
said outer tube of said extension pipe is provided at the top end with a plurality of through holes corresponding in number to said elastic retaining pieces of said first connector;
the top end of said outer tube is fitted into said first connector such that said inner tube of said extension pipe is intimately embraced by said retaining projections of said elastic retaining pieces of said first connector via said through holes of said outer tube.

2. The sprinkler as defined in claim 1, wherein said second connector of said connection member has an upper end portion of a tapered construction.

3. The sprinkler as defined in claim 1, wherein said inner tube of said extension pipe is provided at the bottom end with a slide block fastened therewith whereby said slide block is slidably fitted into the top end of said outer tube.

4. The sprinkler as defined in claim 3, wherein said slide block is provided with one or more washers.

5. A sprinkler comprising:
a handle;
a nozzle; and
a connection structure for connecting said nozzle to said handle in such a manner that said connection structure is fastened at a top end with said nozzle, and at a bottom end with said handle;
wherein said connection structure comprises:
an extension pipe fastened at a bottom end with said handle; and
a connection device fastened at a top end with said nozzle, with a bottom end of said connection device being fitted into a top end of said extension pipe; wherein
said extension pipe is provided at the top end with a plurality of locating holes:
said connection device is provided with a plurality of elastic locating pieces corresponding in number to said locating holes of said extension pipe;
each of said elastic locating pieces is provided with a locating projection;
the bottom end of said connection device is fitted into the top end of said extension pipe in such a manner that said locating projections of said elastic locating pieces are retained in said locating holes of said extension pipe.

6. The sprinkler as defined in claim 5, wherein said connection device is provided at the bottom end with one or more washers.

7. A sprinkler comprising:
a handle;
a nozzle; and
a connection structure for connecting said nozzle to said handle in such a manner that said connection structure is fastened at a top end with said nozzle, and at a bottom end with said handle;
wherein said connection structure comprises:
an extension pipe formed of an outer tube, and an inner tube slidably fitted at a bottom end into a top end of said outer tube, with said outer tube fastened at a bottom end with said handle; and a connection device fastened at a top end with said nozzle, with a bottom end of said connection device being fitted into a top end of said extension pipe; wherein said inner tube of said extension pipe is provided at the top end with a plurality of locating holes;

said connection device is provided with a plurality of elastic locating projections corresponding in number to said locating holes of said extension pipe;

the bottom end of said connection device is fitted into the top end of said extension pipe in such a manner that said locating projections of said connection device are retained in said locating holes of said extension pipe.

8. The sprinkler as defined in claim 7, wherein said connection structure further comprises a connection member which is formed of a first connector, and a second connector, said first connector being fastened at a bottom end with the top end of said outer tube and being provided at a top end with a plurality of elastic retaining pieces, said second connector being rotatably engaged with said first connector, wherein said inner tube is slidably fitted into the top end of said outer tube such that the bottom end of said inner tube is put through said connection member, and that the bottom end of said inner tube is intimately embraced by said elastic retaining pieces of said first connector at such time when said second connector is fastened against said first connector.

* * * * *